US011693774B2

(12) United States Patent
Wu et al.

(10) Patent No.: US 11,693,774 B2
(45) Date of Patent: Jul. 4, 2023

(54) SELECTIVELY UTILIZING A READ PAGE CACHE MODE IN A MEMORY SUBSYSTEM

(71) Applicant: Micron Technology, inc., Boise, ID (US)

(72) Inventors: Jiangang Wu, Milpitas, CA (US); Jing Sang Liu, Shanghai (CN); Jung Sheng Hoei, Newark, CA (US); Kishore Kumar Muchherla, Fremont, CA (US); Mark Ish, San Ramon, CA (US); Myoung Jun Go, San Jose, CA (US); Nolan Tran, Newark, CA (US); Qisong Lin, El Dorado Hills, CA (US)

(73) Assignee: MICRON TECHNOLOGY, INC., Boise, ID (US)

(*) Notice: Subject to any disclaimer, the term of this patent is extended or adjusted under 35 U.S.C. 154(b) by 2 days.

(21) Appl. No.: 17/412,225

(22) Filed: Aug. 25, 2021

(65) Prior Publication Data

US 2023/0065231 A1  Mar. 2, 2023

(30) Foreign Application Priority Data

Aug. 5, 2021  (WO) ................ PCT/CN2021/110836

(51) Int. Cl.
*G06F 12/00* (2006.01)
*G06F 12/0806* (2016.01)

(52) U.S. Cl.
CPC .. *G06F 12/0806* (2013.01); *G06F 2212/1024* (2013.01); *G06F 2212/603* (2013.01)

(58) Field of Classification Search
CPC ......... G06F 12/0806; G06F 2212/1024; G06F 2212/603
See application file for complete search history.

(56) References Cited

U.S. PATENT DOCUMENTS

| 2016/0274820 A1* | 9/2016 | Suzuki | ................. G06F 3/0604 |
| 2018/0189185 A1* | 7/2018 | Peng | ................... G06F 12/0868 |
| 2019/0056870 A1* | 2/2019 | Sun | ........................ G06F 3/0611 |
| 2020/0278797 A1* | 9/2020 | Bavishi | ............... G06F 12/0868 |
| 2021/0279172 A1* | 9/2021 | Hung | .................. G06F 12/0879 |

* cited by examiner

*Primary Examiner* — Arvind Talukdar
(74) *Attorney, Agent, or Firm* — Nicholson De Vos Webster & Elliott LLP

(57) ABSTRACT

A method is described, which includes receiving, by a memory subsystem, a memory command targeted at a memory array; determining, by the memory subsystem, if the memory command is a high priority memory command; and determining if the memory subsystem is processing any non-high priority memory commands. The memory subsystem enables a read page cache mode for processing the memory command in response to determining that (1) the memory command is a high priority memory command and (2) the memory subsystem is not processing any non-high priority memory commands Thereafter, the memory subsystem processes the memory command using the read page cache mode.

20 Claims, 11 Drawing Sheets

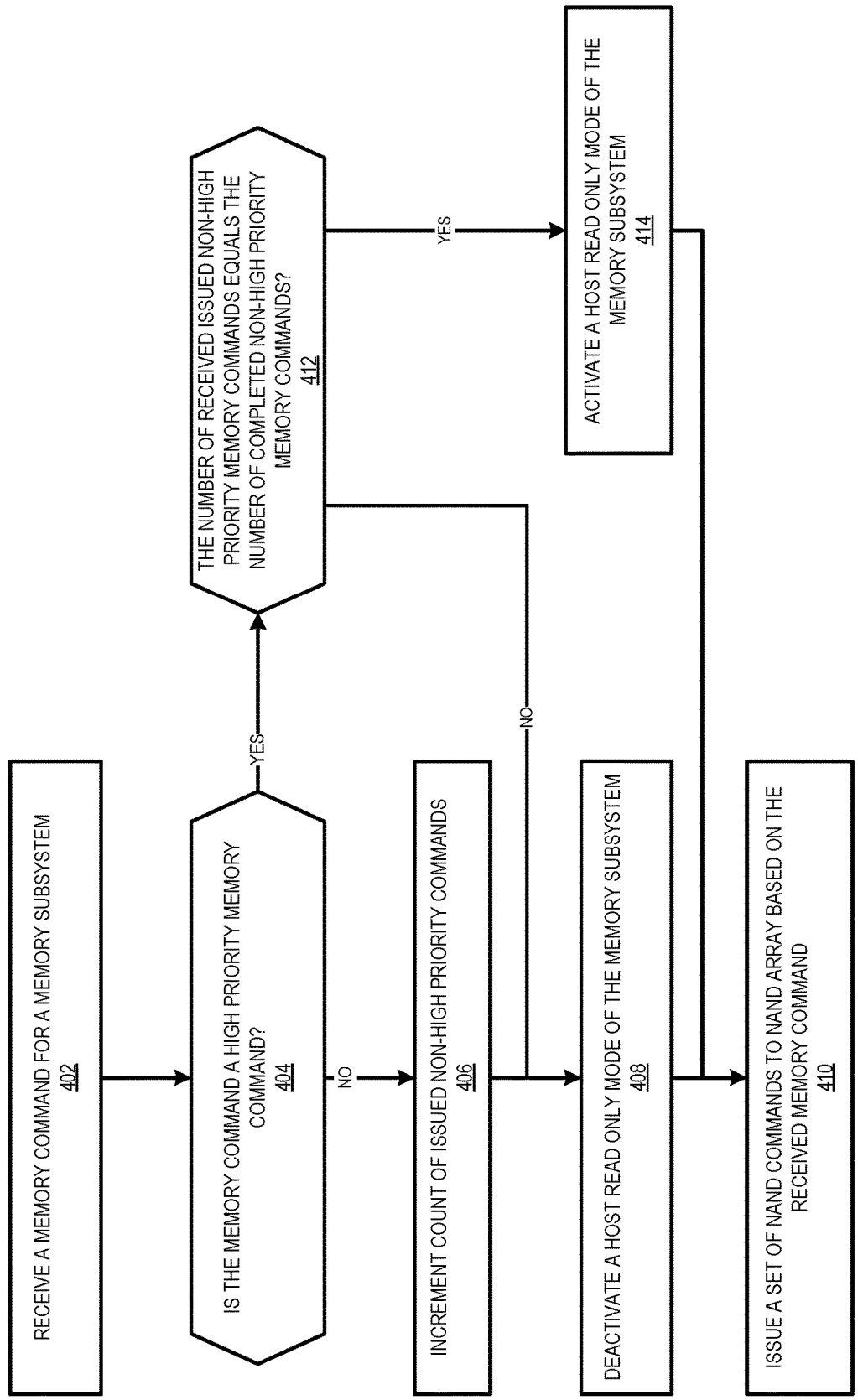

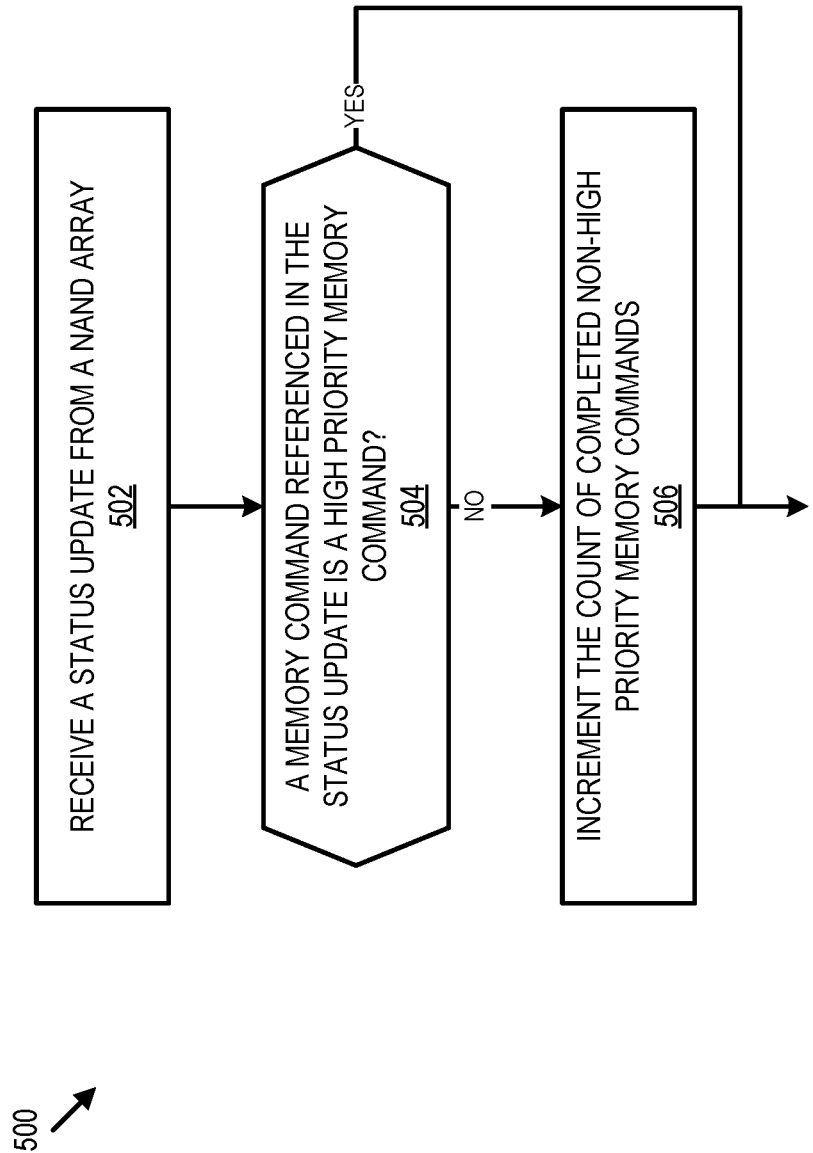

SELECTIVELY UTILIZING A READ PAGE CACHE MODE IN A MEMORY SUBSYSTEM

CROSS-REFERENCE TO RELATED APPLICATION

The present application claims the benefit of International Application No. PCT/CN2021/110836 filed on Aug. 5, 2021, which is hereby incorporated by reference.

TECHNICAL FIELD

The present disclosure generally relates to a read page cache mode, and more specifically, relates to selectively utilizing a read page cache mode in a memory subsystem.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 is a flow diagram of an example method to track a number of non-high priority commands that are active in the memory subsystem for use of a host read only mode, in accordance with some embodiments of the present disclosure.

FIG. 5 is a flow diagram of an example method to track a number of completed/processed non-high priority commands in the memory subsystem, in accordance with some embodiments of the present disclosure.

DETAILED DESCRIPTION

Figure 1:
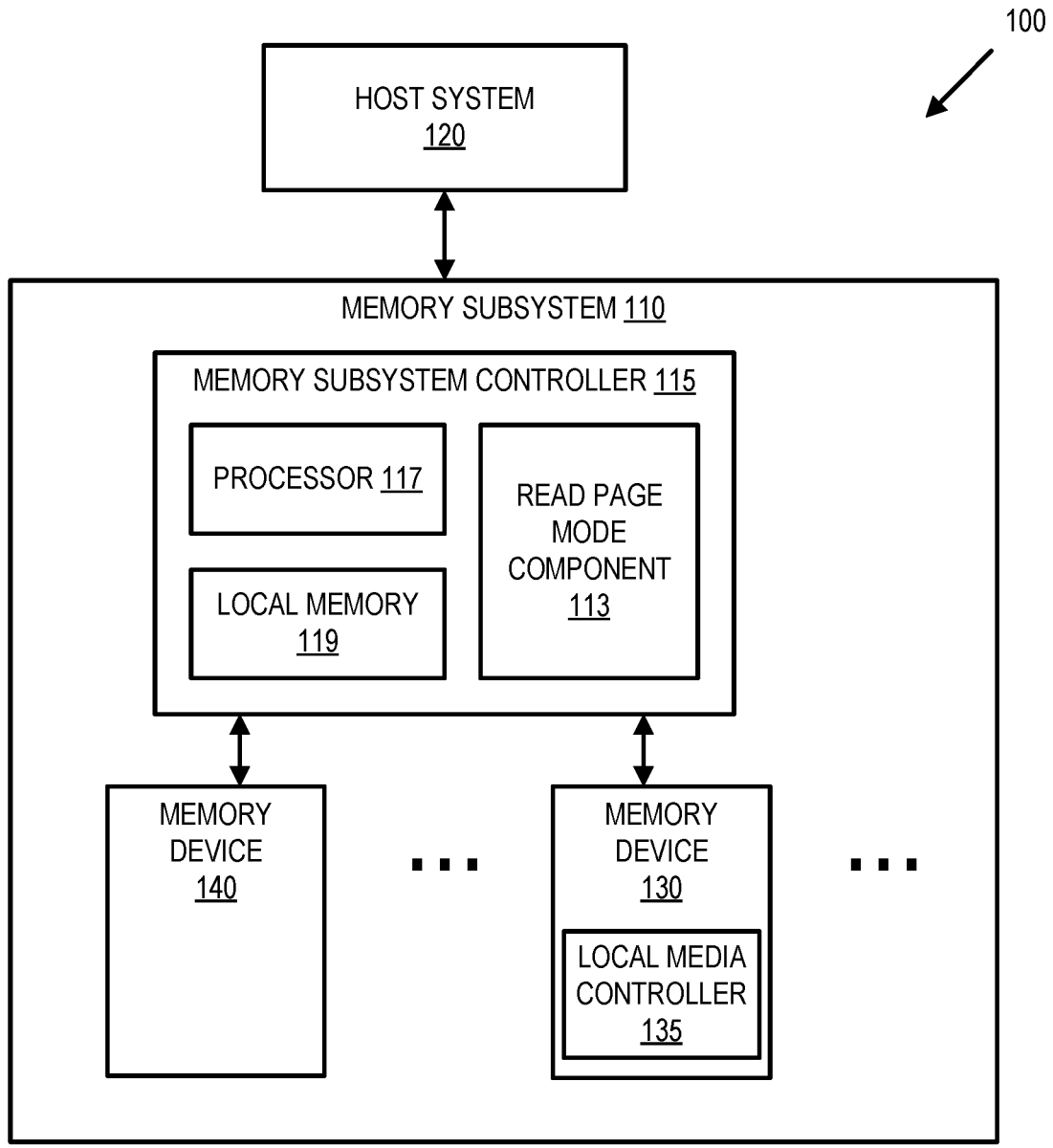
FIG. 1 illustrates an example computing system that includes a memory subsystem in accordance with some embodiments of the present disclosure.

Aspects of the present disclosure are directed to selectively utilizing a read page cache mode in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

NAND flash data throughput has increased over time. For example, data throughput in some cases has increased from 4 megabytes per second (MB/s) to 1.2 gigabytes per second (GB/s). However, despite this increase in data throughput, non-data throughput is not similarly increasing. For example, control, address, and status polling command throughput has not generally increased over time and these related commands occupy a greater ratio of processing time for a memory subsystem in comparison to commands that directly read and write data from/to a NAND array. In particular, to complete a read or write sequence, a memory controller of a memory subsystem can perform asynchronous operations and/or synchronous operations. In some cases, NAND memory devices are asynchronous devices, and all operations performed in these NAND memory devices are asynchronous. In this configuration, data can only be transferred once per cycle. To increase data throughput, input/output commands/operations (e.g., sensing data from a NAND array and writing data to a NAND array) can be made to be synchronous while other commands/operations remain asynchronous. With synchronous operations, data can be transferred multiple times per cycle (e.g., on rising and falling edges of a cycle). For example, instead of transferring one byte of data per cycle, two bytes of data can be transferred per cycle (e.g., one byte of data on each edge of a cycle).

Often when throughput of a memory device is discussed, the focus is on throughput/completion of input/output commands in the memory device. If only throughput of synchronous input/output commands is increased, the cost/time of the asynchronous commands will become a larger percentage/ratio of total cost/time. For example, to transfer 4 kilobytes (KB) of data, the timing ratio of asynchronous operations to synchronous operations can be 1:3. In contrast, when synchronous operations are slower and corresponding synchronous operation throughput is reduced, the ratio can be 1:5 or 1:6. Accordingly, even though there can be consideration to improving synchronous operation throughput, ignoring asynchronous operations has led to a bottleneck in performance increases for memory devices led by stagnant performance goals for asynchronous operations.

This issue with asynchronous operation overhead is not as severely felt with high-density memory devices (e.g., memory devices with four or more dies (sometimes referred to as a logical unit number (LUN)) per channel), as these memory devices include more dies that can operate in parallel in comparison to low-density memory devices (e.g., memory devices that have one or two dies/LUNs per channel). Nevertheless, both high-density and low-density memory devices suffer from this poor ratio of asynchronous to synchronous operations and fail to meet the ceiling of application-specific integrated circuit (ASIC) throughput, in which the memory devices are implemented.

To account for inefficiencies from asynchronous operations, a read page cache mode (sometimes referred to as a read page cache feature) can be enabled in both low-density and high-density memory devices. The read page cache mode allows multiple reads to be performed in parallel and increases sequential read performance for the memory devices. In particular, data for a first read command is output to a host while data for a sequential second read command is being sensed from a NAND array. This parallel operation allows for reduction in the ratio of asynchronous to synchronous operations in the memory device, as much of the asynchronous overhead is shared between parallel performed read commands Nevertheless, this read page cache mode can only be enabled under certain circumstances. For example, the read page cache mode relies on the use of dual data cache registers in each plane: a primary data cache register and a secondary data cache register. Although the primary and second data cache registers enable the read page cache mode to increase performance gains, these data cache registers are susceptible to corruption when used with non-read operations/workloads (e.g., program and erase operations). In particular, these non-read operations rely on the same data cache registers as the read page cache mode, which can result in data corruption when the read page cache mode is enabled during processing of non-read operations. Accordingly, the systems and methods described herein track/monitor active non-read operations to selectively enable/utilize the read page cache mode for read operations. In particular, the read page cache mode is used for high priority read operations (e.g., host read operations) when there are no active non-read operations. Further details will be described below.

Aspects of the present disclosure address the above and other deficiencies by selectively enabling the read page cache mode to process different commands/operations. In particular, the below systems and techniques enable a read page cache mode only during processing of high priority read operations (e.g., multi-plane read commands from a host system) while still supporting multiple command queues, which can include multiple types of memory commands (e.g., read, program, and erase commands) at different priority levels. Accordingly, when non-high priority read operations are present in the command queues, the read page cache mode is disabled. The read cache mode is enabled when only high priority read commands are present in the command queues. Utilizing these techniques, the read page cache mode can be utilized to increase sequential read performance to decrease the ratio of asynchronous to synchronous operations in low-density and high-density memory devices while still allowing the memory subsystem to consistently process other commands (e.g., program and erase commands).

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM)

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a read page mode component 113 that can selectively enable/utilize a read page mode in the memory subsystem 110. In some embodiments, the controller 115 includes at least a portion of the read page mode component 113. For example, the controller 115 can include a processor 117 (processing device) configured to execute instructions stored in local memory 119 for performing the operations described herein. In some embodiments, a read page mode component 113 is part of the host system 110, an application, or an operating system.

The read page mode component 113 can selectively enable or disable a read page mode. Further details with regards to the operations of the read page mode component 113 are described below.

Figure 2:
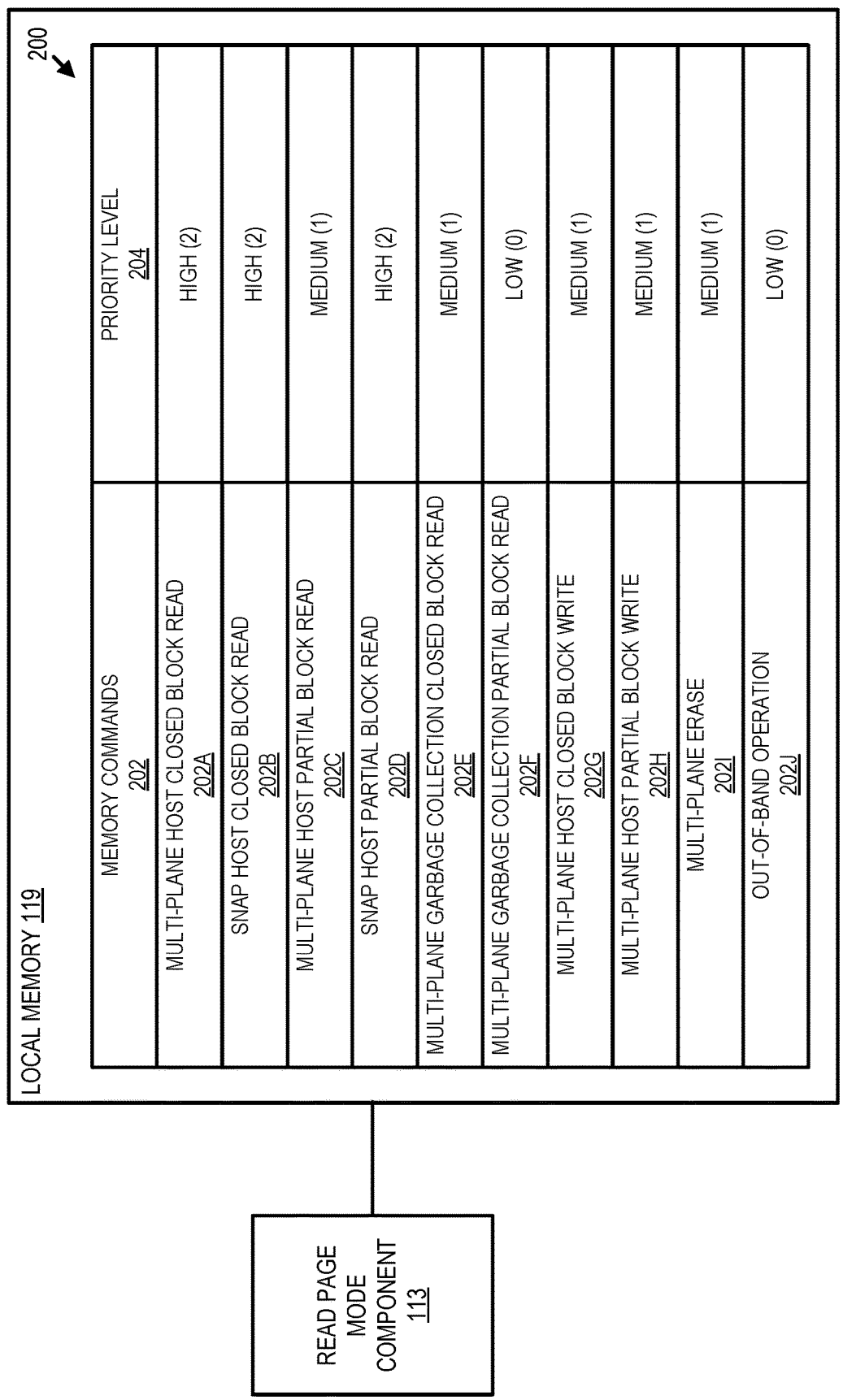
FIG. 2 shows a table that represents memory commands that can be processed by a memory subsystem, in accordance with some embodiments of the present disclosure.

FIG. 2 shows a table 200 that represents memory commands 202 that can be processed by the memory subsystem 110, in accordance with some embodiments of the present disclosure. Each memory command 202 can be associated with various sources. For example, the memory subsystem 110 can receive a memory command 202 (e.g., a read memory command 202) from the host system 120 or a memory command 202 can be internally generated by the memory subsystem 110 (e.g., a memory command 202 that is used for garbage collection). As will be described below, the memory subsystem 110 can thereafter determine a NAND command sequence for fulfilling the received/generated memory command 202 by a corresponding NAND array (e.g., the memory device 130/140). Further, as shown in FIG. 2, each of the memory commands 202 is associated with a priority level 204 that can be managed by the read page mode component 113 while the table 200 (or another similar data structure) is in the local memory 119 or a memory device 130/140. For example, the table 200 includes (1) a multi-plane host closed block read memory command 202A with a priority level of 2 (e.g., a high priority level 204), (2) a snap host closed block read memory command 202B with a priority level of 2 (e.g., a high priority level 204), (3) a multi-plane host partial block read memory command 202C with a priority level of 1 (e.g., a medium priority level 204), (4) a snap host partial block read memory command 202D with a priority level of 2 (e.g., a high priority level 204), (5) a multi-plane garbage collection closed block read memory command 202E with a priority level of 1 (e.g., a medium priority level 204), (6) a multi-plane garbage collection partial block read memory command 202F with a priority level of 0 (e.g., a low priority level 204), (7) a multi-plane host closed block write memory command 202G with a priority level of 1 (e.g., a medium priority level 204), (8) a multi-plane host partial block write memory command 202H with a priority level of 1 (e.g., a medium priority level 204), (9) a multi-plane erase memory command 202I with a priority level of 1 (e.g., a medium priority level 204), and (10) an out-of-band (OOB) memory command 202J (e.g., to recover from NAND read failures) with a priority level of 0 (e.g., a low priority level 204).

The priority levels 204 are used by the memory subsystem 110 for processing the memory commands 202 and the priority levels 204 can be associated with a type of the memory commands 202 (e.g., a read memory command 202, a write memory command 202, an erase memory command 202, etc.). Each of the memory commands 202 can be associated by the memory subsystem 110 to a NAND command sequence, which is composed of a set of NAND commands/operations. For example, the NAND command sequences can include a multi-plane logical block address (LBA) read command sequence (sometimes referred to as NAND_CMD_MULTI_PLANE_LBA_READ command sequence). The multi-plane LBA read command sequence includes one or more READ PAGE MULTI-PLANE (00h-32h) commands, which queue a plane to transfer data from the NAND flash array to data cache registers, in front of a READ PAGE (00h-30h) command, which selects the final plane begins the read operation for all previously queued planes. The one or more READ PAGE MULTI-PLANE (00h-32h) and READ PAGE (00h-30h) commands can be used along with READ STATUS ENHANCED (78h) commands, which return the status of the addressed die and confirm whether the die is busy or ready for processing commands Subsequently, a CHANGE READ COLUMN ENHANCED (06h-E0h) command can be used for transferring data from data cache registers of each plane to the memory subsystem controller 115 of the memory subsystem 110 for eventual transfer to the host system 120. An example implementation of a multi-plane LBA read command sequence is shown below:

NAND_CMD_MULTI_PLANE_LBA_READ
  1. READ PAGE MULTI-PLANE (00h-32h) command with Plane 0 Column Address and Row Address
  2. READ STATUS ENHANCED (78h) command with Plane 0 Row Address, Status is Busy (SR[6])
  3. READ STATUS ENHANCED (78h) command with Plane 0 Row Address, Status is Ready (SR[6])
  1. READ PAGE MULTI-PLANE (00h-32h) command with Plane 1 Column Address and Row Address
  2. READ STATUS ENHANCED (78h) command with Plane 1 Row Address, Status is Busy (SR[6])
  3. READ STATUS ENHANCED (78h) command with Plane 1 Row Address, Status is Ready (SR[6])
  1. READ PAGE MULTI-PLANE (00h-32h) command with Plane 2 Column Address and Row Address
  2. READ STATUS ENHANCED (78h) command with Plane 2 Row Address, Status is Busy (SR[6])
  3. READ STATUS ENHANCED (78h) command with Plane 2 Row Address, Status is Ready (SR[6])
  1. READ PAGE (00h-30h) command with Plane 3 Column Address and Row Address
  2. wait tR
  3. READ STATUS ENHANCED (78h) command with Plane 3 Row Address, Status is Busy (SR[5])
  4. READ STATUS ENHANCED (78h) command with Plane 3 Row Address, Status is Ready (SR[5])
  1. CHANGE READ COLUMN ENHANCED (06h-E0h) with Plane 0 Column Address and Row Address, LBA Read (Offset, Length).

The NAND command sequences can also include an LBA read no page read command sequence (sometimes referred to a NAND_CMD_LBA_READ_NO_PAGE_READ command sequence). The LBA read no page read command sequence includes use of a READ STATUS ENHANCED (78h) command, which returns the status of the addressed die and confirms whether the die is busy or ready for processing commands, and a CHANGE READ COLUMN ENHANCED (06h-E0h) for transferring data from data cache registers of a NAND array. An example implementation of an LBA read no page read command sequence is shown below:

NAND_CMD_LBA_READ_NO_PAGE_READ
  1. READ STATUS ENHANCED (78h) command with Plane 0 Row Address, LUN Select Command
  2. CHANGE READ COLUMN ENHANCED (06h-E0h) with Plan 0 Column Address and Row Address, LBA Read (Offset, Length)

Apart from the CHANGE READ COLUMN ENHANCED (06h-E0h) commands in the above-described NAND command sequences, all other NAND commands are asynchronous commands. Accordingly, there is considerable asynchronous overhead in the above-described NAND command sequences. A read page cache mode can ameliorate some asynchronous overhead. In particular, NAND command sequences that utilize a read page cache mode can be used. For example, a multi-plane LBA read page cache sequence (sometimes referred to as a NAND_CMD_MULTI_PLANE_LBA_READ_PAGE_CACHE_SEQ command sequence) can be used. A multi-plane LBA read page cache sequence includes use of a READ PAGE MULTI-PLANE (00h-32h) command that queues a plane to transfer data from the NAND flash array to data cache registers. This command can be issued one or more times. Each time a new plane address is specified by a READ PAGE MULTI-PLANE (00h-32h) command, that plane is also queued for data transfer. The READ PAGE (00h-30h) command is issued to select the final plane and to begin the read operation for all previously queued planes. Further, a READ PAGE CACHE SEQUENTIAL (31h) command reads the next sequential page into the data cache registers while the previous page is output from the data cache registers and a CHANGE READ COLUMN ENHANCED (06h-E0h) command can be used for transferring the final data from data cache registers to the memory subsystem controller 115 of the memory subsystem 110 for eventual transfer to the host system 120. During these operations/commands, READ STATUS ENHANCED (78h) commands can be used, which return the status of the addressed die and confirm whether the die is busy or ready for processing commands. An example implementation of multi-plane LBA read page cache sequence is shown below:

NAND_CMD_MULTI_PLANE_LBA_READ_PAGE_CACHE_SEQ
1. READ PAGE MULTI-PLANE (00h-32h) command with Plane 0 Column Address and Row Address
2. Wait tDBSY
3. READ STATUS ENHANCED (78h) command with Plane 0 Row Address, Status is Ready (SR[6])
1. READ PAGE MULTI-PLANE (00h-32h) command with Plane 1 Column Address and Row Address
2. Wait tDBSY
3. READ STATUS ENHANCED (78h) command with Plane 1 Row Address, Status is Ready (SR[6])
1. READ PAGE MULTI-PLANE (00h-32h) command with Plane 2 Column Address and Row Address
2. Wait tDBSY
3. READ STATUS ENHANCED (78h) command with Plane 2 Row Address, Status is Ready (SR[6])
1. READ PAGE (00h-30h) command with Plane 3 Column Address and Row Address
2. wait tR
3. READ STATUS ENHANCED (78h) command with Plane 3 Row Address, Status is Busy (SR[6])
4. READ STATUS ENHANCED (78h) command with Plane 3 Row Address, Status is Ready (SR[6])
1. READ STATUS ENHANCED (78h) command with Plane 0 Row Address, LUN Select Command
2. READ PAGE CACHE SEQUENTIAL (31h)
3. wait tRCBSY
4. READ STATUS ENHANCED (78h) command with Plane 0 Row Address, Status is Busy (SR[6])
5. READ STATUS ENHANCED (78h) command with Plane 0 Row Address, Status is Ready (SR[6])
1. CHANGE READ COLUMN ENHANCED (06h-E0h) with Plane 0 Column Address and Row Address, LBA Read (Offset, Length)

Other NAND command sequences can also be used to take advantage of efficiencies provided by a read page cache mode, including an LBA read page cache sequential sequence (sometimes referred to as a NAND_CMD_LBA_READ_PAGE_CACHE_SEQ command sequence), a LBA read page cache last sequence (sometimes referred to as a NAND_CMD_LBA_READ_PAGE_CACHE_LAST command sequence), and a read page cache last sequence (sometimes referred to as a NAND_CMD_READ_PAGE_CACHE_LAST command sequence). Example implementations of each NAND command sequence are shown below:

NAND_CMD_LBA_READ_PAGE_CACHE_SEQ
1. READ STATUS ENHANCED (78h) command with Plane 0 Row Address, LUN Select Command
2. READ PAGE CACHE SEQUENTIAL (31h)
3. wait tRCBSY
4. READ STATUS ENHANCED (78h) command with Plane 0 Row Address, Status is Busy (SR[6])
5. READ STATUS ENHANCED (78h) command with Plane 0 Row Address, Status is Ready (SR[6])
1. CHANGE READ COLUMN ENHANCED (06h-E0h) with Plane 0 Column Address and Row Address, LBA Read (Offset, Length)

NAND_CMD_LBA_READ_PAGE_CACHE_LAST
1. READ STATUS ENHANCED (78h) command with Plane 0 Row Address, LUN Select Command
2. READ PAGE CACHE LAST (3Fh)
3. wait tRCBSY
4. READ STATUS ENHANCED (78h) command with Plane 0 Row Address, Status is Busy (SR[5])
5. READ STATUS ENHANCED (78h) command with Plane 0 Row Address, Status is Ready (SR[5])
1. CHANGE READ COLUMN ENHANCED (06h-E0h) with Plane 0 Column Address and Row Address, LBA Read (Offset, Length)

NAND_CMD_READ_PAGE_CACHE_LAST
1. READ STATUS ENHANCED (78h) command with Plane 0 Row Address, LUN Select Command
2. READ PAGE CACHE LAST (3Fh)
3. wait tRCBSY
4. READ STATUS ENHANCED (78h) command with Plane 0 Row Address, Status is Busy (SR[5])
5. READ STATUS ENHANCED (78h) command with Plane 0 Row Address, Status is Ready (SR[5])

In the above, a READ PAGE CACHE LAST (3Fh) command ends the read page cache sequence and copies a page from a data cache register. The above NAND command sequences, which utilize the read cache page mode, reduce the ratio of asynchronous to synchronous operations because asynchronous commands are utilized for multiple sequential reads. However, these NAND command sequences cannot be utilized when non-high priority memory commands are being processed because processing of high priority memory commands (e.g., host read memory commands) and non-high priority memory commands (e.g., erase, write, and non-host read memory commands) both utilize data cache registers, which can lead to corruption of data in these data cache registers. Accordingly, the memory subsystem 110 should ensure non-high priority memory commands are not being processed when a read page cache mode is enabled.

Figure 3:
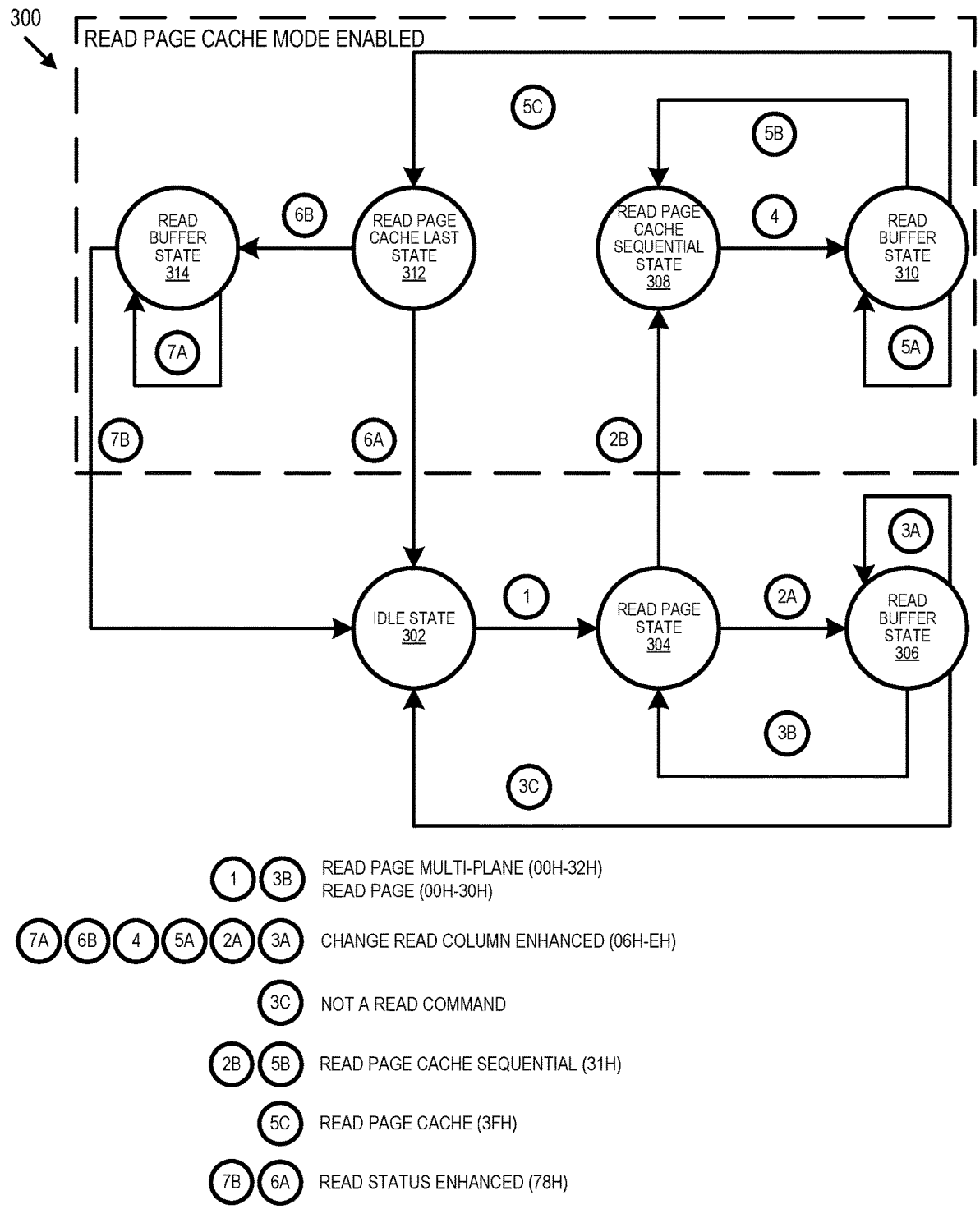
FIG. 3 shows a state diagram/machine for processing negative-and (NAND) commands of NAND command sequences by a memory subsystem selectively using the read page cache mode, in accordance with some embodiments of the present disclosure.

Turning now to FIG. 3, a state diagram/machine 300 is presented for processing NAND commands of NAND command sequences by a memory subsystem 110 selectively using the read page cache mode, in accordance with some embodiments of the present disclosure. In particular, the memory subsystem 110 generates/determines a set of NAND commands of a NAND command sequence based on one or more memory commands 202 that are either received from the host system 120 or are internally generated by the memory subsystem 110. The state diagram 300 represents states for processing each of these NAND commands selectively using the read page cache mode and for purposes of illustration, these NAND commands can be considered generated/derived from a memory command 202 received from the host system 120 (i.e., a host read memory command 202). As noted above, the read page cache mode can be used when only high priority memory commands 202 are pending for issuance to the NAND array and utilize data cache registers to improve read performance.

As shown in FIG. 3, the state diagram/machine 300 includes an idle state 302, during which the memory subsystem 110 waits for a NAND command. As noted above, a NAND command is derived from a memory command 202, which is received or generated by the memory subsystem 110. In response to a READ PAGE MULTI-PLANE (00h-32h) command or a READ PAGE (00h-30h) command (denoted by reference numeral 1), the memory subsystem 110 moves from the idle state 302 to the read page state 304. The READ PAGE MULTI-PLANE (00h-32h) command queues a plane to transfer data from the NAND flash array to its data cache register. This command can be issued one or more times consecutively and each time a new plane address is specified, that plane is also queued for data transfer. The READ PAGE (00h-30h) command is issued to select a final plane and to begin the read operation for all previously queued planes. For example, when a four-plane read is triggered, three READ PAGE MULTI-PLANE (00h-32h) commands are issued, corresponding to the first three planes, and subsequently a READ PAGE (00h-30h) command is issued, corresponding to the final/fourth plane to be read. When a single-plane read is triggered, a single READ PAGE (00h-30h) command can be issued for reading this single plane.

Although the state machine 300 is described in relation to specific NAND commands (e.g., a READ PAGE MULTI-PLANE (00h-32h) command or a READ PAGE (00h-30h) command), these NAND commands are used purely for illustrative purposes. Accordingly, similar NAND commands (e.g., NAND commands that perform similar or identical operations) can be used in relation to the state machine 300.

Although the idle state 302 is shown in relation to only a READ PAGE MULTI-PLANE (00h-32h) command and a READ PAGE (00h-30h) command, other NAND commands are possible and will trigger different processing techniques. In particular, the state machine 300 can be used in relation to processing NAND commands for use of a read page cache mode and other NAND commands (e.g., NAND commands in relation to write or erase operations) that are not used with a read page cache mode, are used in relation to other state machines. Accordingly, while other NAND commands can be processed by the memory subsystem 110 while in the idle state 302, only a READ PAGE MULTI-PLANE (00h-32h) command, a READ PAGE (00h-30h) command, or similar commands cause the memory subsystem 110 to move from the idle state 302 and to the read page state 304.

As noted above, upon issuance of a READ PAGE MULTI-PLANE (00h-32h) command or a READ PAGE (00h-30h) command, the memory subsystem 110 moves to the read page state 304 to read a page from the NAND array. In response to a CHANGE READ COLUMN ENHANCED (06h-E0h) command (denoted by reference numeral 2A), the memory subsystem 110 moves from the read page state 304 to the read buffer state 306, which allows enablement of the read page cache mode. The CHANGE READ COLUMN ENHANCED (06h-E0h) command outputs data from an addressed die's data cache register at a specified column address for a selected plane to a host system 120 (e.g., to a memory of a host system 120). After data output is complete on the selected plane, another CHANGE READ COLUMN ENHANCED (06h-E0h) command can be issued to begin data output on another plane to the host system 120. In particular, in response to another CHANGE READ COLUMN ENHANCED (06h-E0h) command (denoted by reference numeral 3A), the memory subsystem 110 remains at the read buffer state 306 to output data on an addressed die's data cache register at the specified column address for a selected plane. In contrast, in response to a READ PAGE MULTI-PLANE (00h-32h) command or a READ PAGE (00h-30h) command (denoted by reference numeral 3B), the memory subsystem 110 moves from the read buffer state 306 back to the read page state 304 to again transfer data from a plane of the NAND flash array to its data cache register. Alternatively, in response to the memory subsystem 110 completing the corresponding read operation (e.g., no other NAND commands are pending corresponding to a currently processed host read command) and/or receiving a NAND command (denoted by reference numeral 3C), the memory subsystem 110 moves from the read buffer state 306 back to the idle state 302.

Returning to the read page state 304, when the memory subsystem 110 receives a READ PAGE CACHE SEQUENTIAL (31H) command while in the read page state 304 (denoted by reference numeral 2B), the memory subsystem 110 moves to the read page cache sequential state 308 to begin reading sequential data from the NAND array via a read page cache mode. In particular, the READ PAGE MULTI-PLANE (00h-32h) command or the READ PAGE (00h-30h) command originally received to cause movement to the read page state 304, results in movement of a page of data from the NAND array to a secondary page register of a corresponding plane. When a READ PAGE CACHE SEQUENTIAL (31H) command is received to cause movement to the read page cache sequential state 308, it results in movement of a page of data from the NAND array to a primary data register of a next sequential plane. This is in contrast to a CHANGE READ COLUMN ENHANCED (06h-E0h) command that causes movement to the read page buffer state 306 and return of data from a data register of the plane to the host system 120.

In response to a CHANGE READ COLUMN ENHANCED (06h-E0h) command (denoted by reference numeral 4), the memory subsystem 110 moves from the read page cache sequential state 308 to the read buffer state 310 for reading data from the data cache registers to the host system 120. In particular, data is now in both the first and second data cache registers for a particular set of planes. The CHANGE READ COLUMN ENHANCED (06h-E0h) command causes movement of data from the secondary data cache register of a plane to the host system 120. In some embodiments, the CHANGE READ COLUMN ENHANCED (06h-E0h) command can be a high priority read command (e.g., a command with a highest priority level that corresponds to a host read request).

While in the read buffer state 310, one or more additional CHANGE READ COLUMN ENHANCED (06h-E0h) commands (denoted by reference numeral 5A) can be processed to move data from the secondary data cache register of other corresponding planes to the host system 120. In contrast, in response to a READ PAGE CACHE SEQUENTIAL (31H) command (denoted by reference numeral 5B), the memory subsystem 110 moves from the read buffer state 310 back to the read page cache sequential state 308 to (1) transfer data from a primary data cache register to a secondary data cache register, which is now free since corresponding data was transferred to the host system 120 and (2) trigger reading/ movement of a next sequential piece of data from the NAND flash array to the now free/empty primary data register. Additional CHANGE READ COLUMN ENHANCED (06h-E0h) commands can be used to move data from the secondary data cache register, which was transferred from primary data cache registers, to the host system 120.

Returning to the read buffer state 310, in response to the memory subsystem 110 receiving a READ PAGE CACHE LAST (3FH) command (denoted by reference numeral 5C), the memory subsystem 110 moves from the read buffer state 310 to the read page cache last state 312. In particular, the READ PAGE CACHE LAST (3FH) command indicates a last movement of date to the host system 110, such that data is transferred from a primary data cache register to a secondary data cache register. However, unlike a READ PAGE CACHE SEQUENTIAL (31H) command, the READ PAGE CACHE LAST (3FH) command does not trigger reading/movement of a next sequential piece of data from the NAND flash array to the now free/empty primary data register.

In response to a READ STATUS ENHANCED (78H) command (denoted by reference numeral 6A), the memory subsystem 110 moves from the read page cache last state 312 back to the idle state 302. In particular, the read status enhanced (78H) command returns the status of the addressed die and, in effect, discards any remaining data in data cache registers of each plane that have not been returned to the host system 120.

Conversely, in response to a CHANGE READ COLUMN ENHANCED (06h-E0h) (denoted by reference numeral 6B), the memory subsystem 110 moves to the read buffer state 314 for reading data from the data cache registers to the host system 120. In particular, the CHANGE READ COLUMN ENHANCED (06h-E0h) command causes movement of data from the secondary data cache register of a plane to the host system 120. While in the read buffer state 314, one or more additional CHANGE READ COLUMN ENHANCED (06h-E0h) commands (denoted by reference numeral 7A) can be processed to move data from the secondary data cache register of other corresponding planes to the host system 120. This cycle continues until a READ STATUS ENHANCED (78H) command is received (denoted by reference numeral 7B). Upon receipt of a READ STATUS ENHANCED (78H) command, the memory subsystem 110 moves from the read buffer state 314 back to the idle state 302 to return the status of the addressed die.

The state diagram/machine 300 manages NAND commands to ensure that only corresponding high priority memory commands 202 are being processed while in the read page cache mode. Turning now to FIG. 4, a flow diagram will be described of an example method 400 to track a number of non-high priority commands that are active in the memory subsystem 110 for use of a host read only mode, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the read page component 113 of FIG. 1. Although shown in a particular sequence or order, unless otherwise specified, the order of the operations can be modified. Thus, the illustrated embodiments should be understood only as examples, and the illustrated processes can be performed in a different order, and some processes can be performed in parallel. Additionally, one or more operations can be omitted in various embodiments. Thus, not all operations are required in every embodiment. Other process flows are possible.

As shown in FIG. 4, the method 400 commences at operation 402 with the processing device receiving a memory command 202. In particular, the memory command 202 can be any of the memory commands 202 described above in relation to FIG. 2. In particular, the received memory command 202 can be a memory command 202 that is received from the host system 120 (e.g., a host write read or write memory command 202) or an internally generated memory command 202 (e.g., a memory command 202 as part of a garbage collection process).

At operation 404, the processing device determines if the received memory command 202 is a high priority memory command. For example, the processing device can compare the memory command 202 to the memory commands shown in FIG. 2. In response to the received memory command 202 corresponding to a memory command 202 with a high priority level (e.g., a HIGH (2) priority level), the processing device determines that the received memory command 202 is a high priority memory command and the method 400 moves to operation 412. Otherwise, the processing device determines that the received memory command 202 is a non-high priority memory command. In response to determining that the received memory command 202 is a non-high priority memory command, the method 400 moves to operation 406.

At operation 406, the processing device increments a count of issued non-high priority memory commands. In particular, the processing device adds one to the count of issued non-high priority memory commands. In this fashion, the processing device tracks the number of issued non-high priority memory commands.

At operation 408, the processing device deactivates a host read only mode of the memory subsystem 110. The host read only mode is used to process host read memory commands 202 in the memory subsystem 110. Since the processing device is aware of at least one non-high priority memory command that has not yet completed (i.e., the received memory command 202 from operation 402), which must correspond to a non-host read memory command since only host read memory commands 202 are high-priority memory commands (i.e., the memory commands 202A, 202B, and 202D), the processing device deactivates the host read only mode of the memory subsystem 110.

At operation 410, a set of NAND commands corresponding to the received memory command are issued to the NAND array of the memory subsystem 110 for completing the received memory command 202. In particular, one or more of the NAND command sequences describes above can be used for fulfilling the received memory command 202.

Returning to operation 406, in response to determining that the received memory command 202 is a high priority memory command 202, the method 400 moves to operation 412. At operation 412, the processing device determines if the count of issued non-high priority memory commands is equal to the count of completed non-high priority memory commands. In this case, no non-high priority memory commands are pending in the memory subsystem 110, as all received non-high priority memory commands have completed. When the count of issued non-high priority memory commands is equal to the count of completed non-high priority memory commands, the method 400 moves to operation 414 to activate the host read only mode since only high-priority memory commands (i.e., host read memory commands 202) are active in the memory subsystem 110. Following operation 414, the method 400 moves to operation 410. In contrast, in response to the processing device determining that the count of issued non-high priority memory commands is not equal to the count of completed non-high priority memory commands (e.g., the count of issued non-high priority memory commands is greater than the count of completed non-high priority memory commands), the method 400 moves to operation 408.

As described above, the method 400 tracks a count of non-high priority commands that are active in the memory subsystem 110 and compares this number to a count of completed non-high priority memory commands to selectively enable a host read only mode. Turning now to FIG. 5, a flow diagram will be described of an example method 500 to track a number of completed/processed non-high priority commands in the memory subsystem 110, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the read page component 113 of FIG. 1. Although shown in a particular sequence or order, unless otherwise specified, the order of the operations can be modified. Thus, the illustrated embodiments should be understood only as examples, and the illustrated processes can be performed in a different order, and some processes can be performed in parallel. Additionally, one or more operations can be omitted in various embodiments. Thus, not all operations are required in every embodiment. Other process flows are possible.

As shown in FIG. 5, the method 500 commences at operation 502 with the processing device receiving a status update from the NAND array that indicates that a memory command 202 has successfully completed. In particular, the status update indicates that the NAND array has successfully processed a memory command 202 (e.g., program, erase, or write one or more portions of the NAND array), including one or more corresponding NAND commands.

At operation 504, the processing device determines whether the memory command 202 referenced in the status update is a high priority memory command 202. For example, the processing device can compare the memory command 202 to the memory commands shown in FIG. 2. In response to the referenced memory command 202 of the status update corresponding to a memory command 202 that does not have a high priority level 204 (e.g., a MEDIUM (1) or LOW (0) priority level 204), the method 500 moves to operation 506.

At operation 506, the processing device increments the count of completed non-high priority memory commands. In particular, the processing device adds one to the count of completed non-high priority memory commands. In this fashion, the processing device tracks the number of completed non-high priority memory commands 202. As noted above, this count of completed non-high priority memory commands can be used to compare against the count of issued non-high priority memory commands to determine when the host read only mode is active in the memory subsystem 110.

Returning to operation 504, in response to determining that the referenced memory command 202 of the status update corresponds to a memory command 202 that does have a high priority level 204 (e.g., a HIGH (2) priority level 204), the method 500 bypasses operation 506 such that the method 500 concludes. In this fashion, the count of completed non-high priority memory commands is not incremented as the processed/completed memory command is a high priority memory command 202.

Figure 6A:
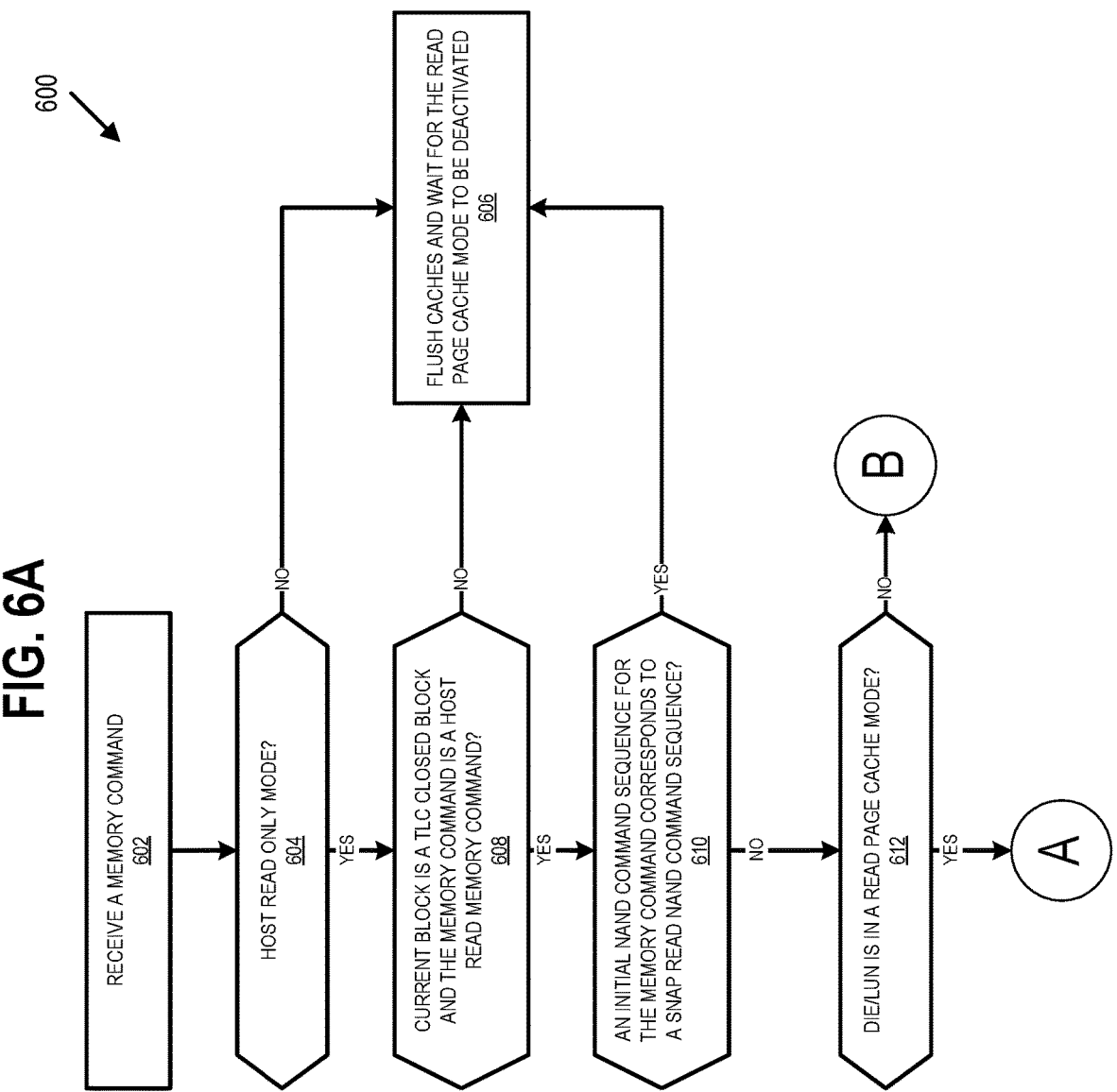
FIGS. 6A-6C is a flow diagram of an example method to process memory commands in the memory subsystem selectively using a read page cache mode, in accordance with some embodiments of the present disclosure.
Figure 6B:
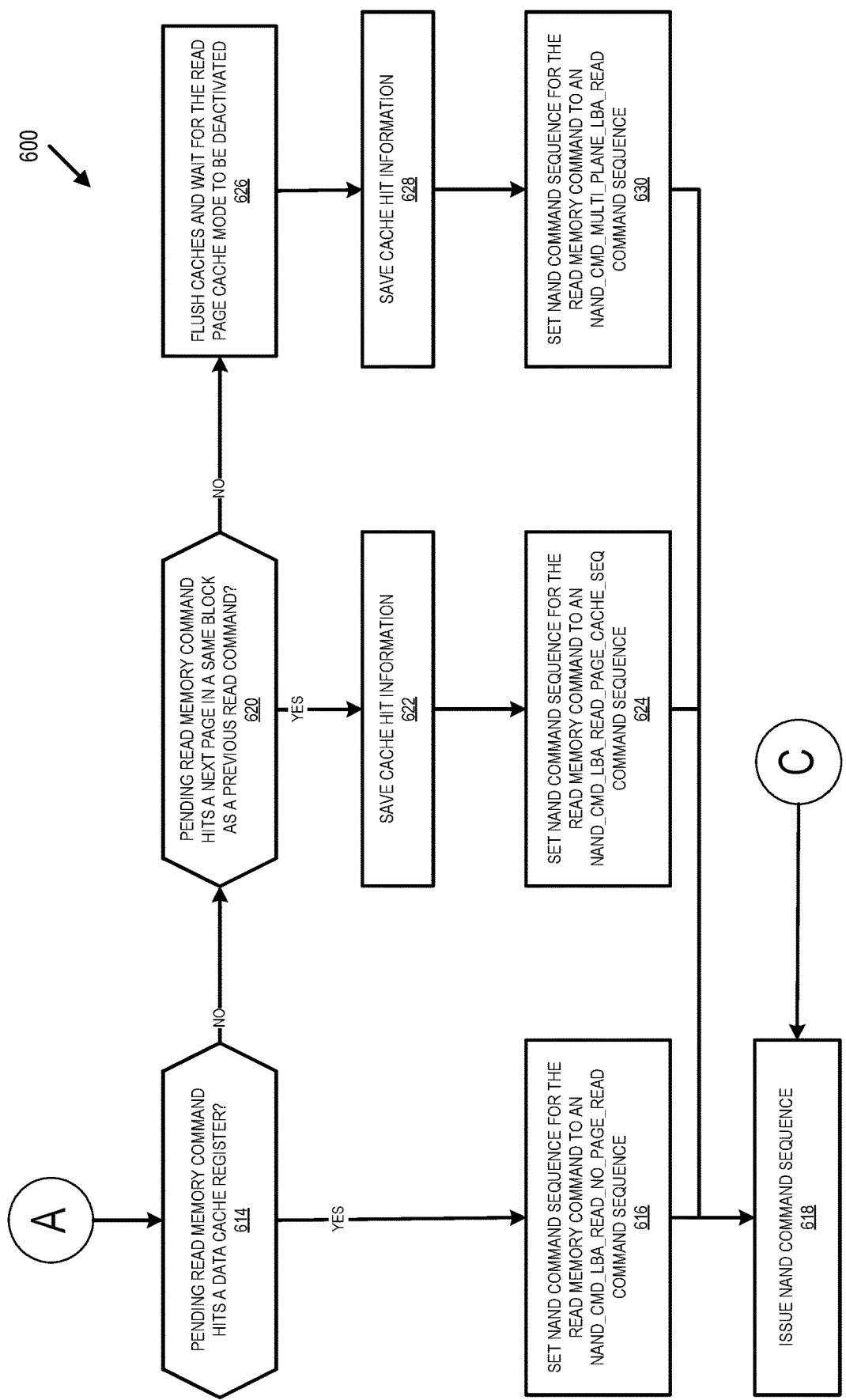
Figure 6C:
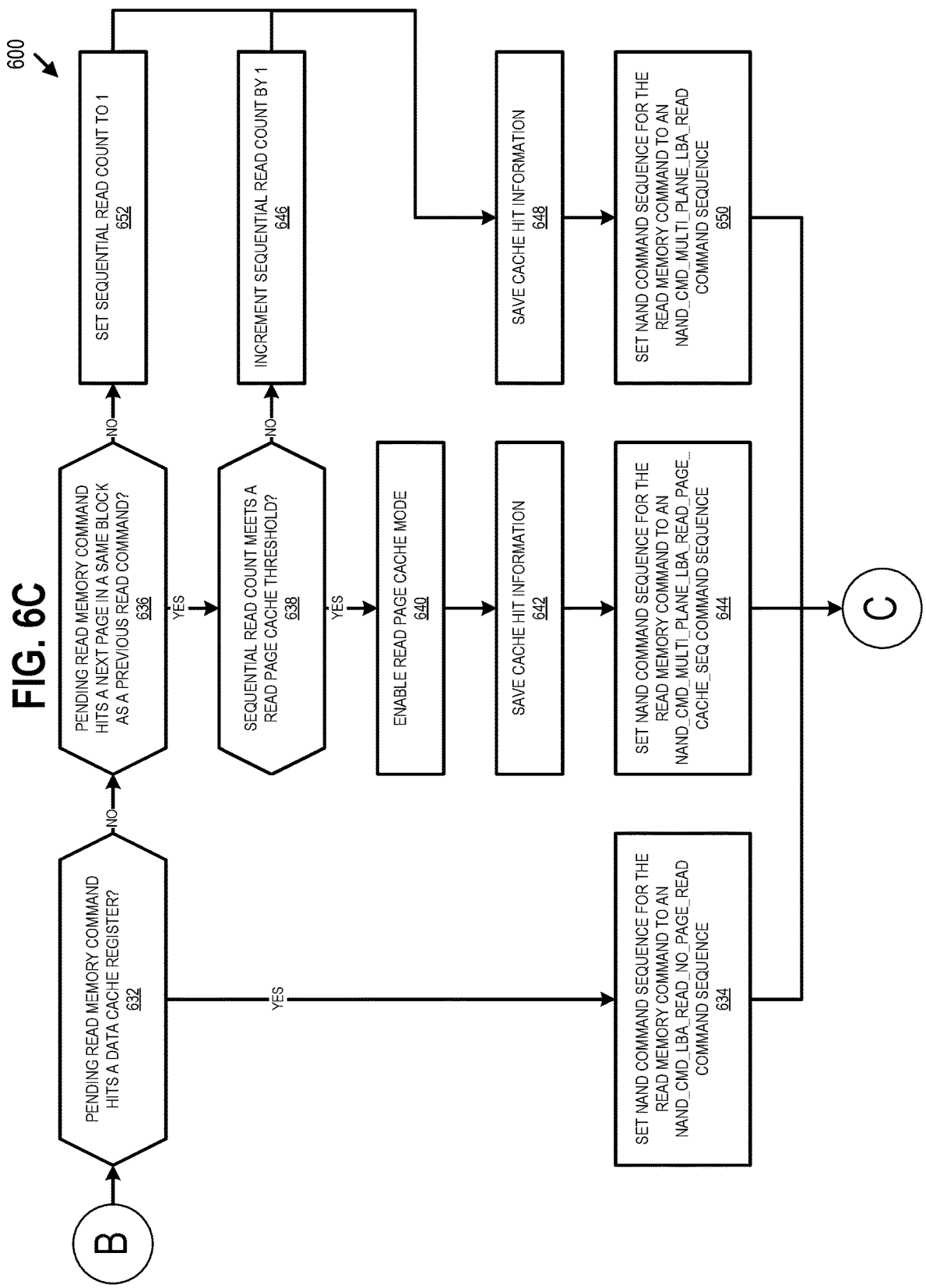

Turning now to FIGS. 6A-6C, a flow diagram will be described of an example method 600 to process memory commands 202 in the memory subsystem 110 selectively using a read page cache mode, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the read page component 113 of FIG. 1. Although shown in a particular sequence or order, unless otherwise specified, the order of the operations can be modified. Thus, the illustrated embodiments should be understood only as examples, and the illustrated processes can be performed in a different order, and some processes can be performed in parallel. Additionally, one or more operations can be omitted in various embodiments. Thus, not all operations are required in every embodiment. Other process flows are possible.

As shown in FIG. 6A, the method 600 commences at operation 602 with the processing device receiving a memory command 202. For example, the processing device of the memory subsystem 110 can receive a read, program, or an erase memory command 202 from the host system 120, or the memory command 202 can be internally generated in the memory subsystem 110. In some embodiments, the receive memory command 202 is one of the memory commands 202 shown in FIG. 2.

At operation 604, the processing device determines if the memory subsystem 110 is in a host read only mode. In particular, the processing device can determine if a host read only mode flag is set (e.g., set to the value "1") to indicate that only high priority memory commands 202 (e.g., read memory commands 202 from the host system 120) and no non-high priority memory commands 202 are being processed by the memory subsystem 110. In response to determining that the host read only mode is not activated, which indicates that the received read memory command 202 is not a high priority memory command 202 (e.g., an erase or program memory command), the method 600 moves to operation 606.

Figure 7:
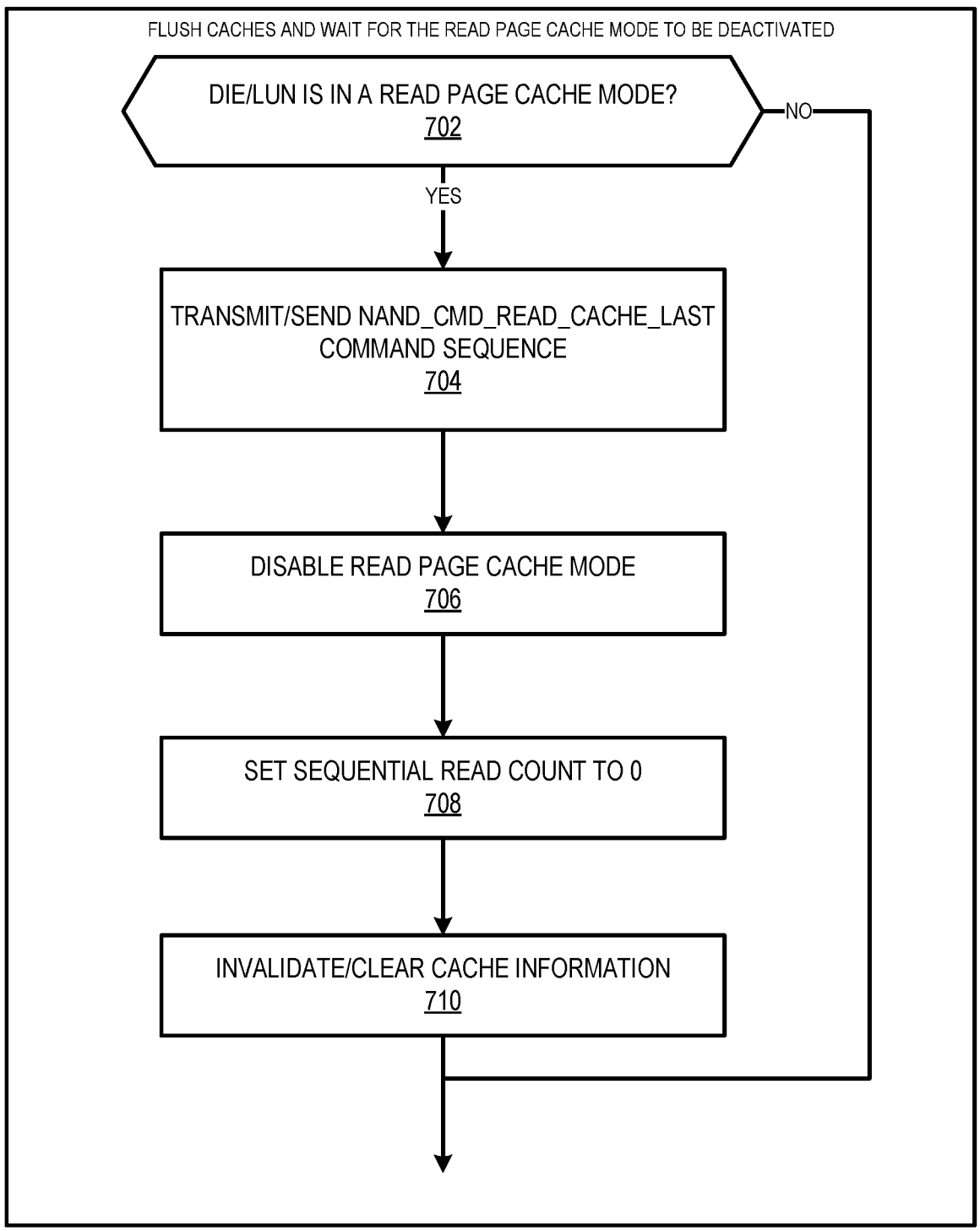
FIG. 7 is a flow diagram of an example method to determine if a read page cache mode is active in the addressed die and if the read page cache mode is active in the die, in accordance with some embodiments of the present disclosure.

At operation 606, if a read page cache mode is active in the addressed die/LUN, the processing device deactivates the read page cache mode and waits to handle the current non-high priority memory command 202 once corresponding cached information has been flushed. For example, FIG. 7 shows operations that can be performed by the processing device at operation 606. In particular, as shown in FIG. 7, the processing device determines if the die/LUN is in a read page cache mode at operation 702. For example, the processing device can determine if a read page cache mode flag is set (e.g., set to the value "1") to indicate that the read page cache mode is activated. In response to determining that the read page cache mode is not activated, operation 606 is complete. Conversely, in response to determining that the read page cache mode is activated, operation 704 is performed. At operation 704, the processing device sends/issues a command to complete all operations prior to disabling the read page cache mode. For example, the processing device can send a NAND_CMD_READ_CACHE_LAST command sequence to the NAND array to complete all operations prior to disabling the read page cache mode. At operation 706, the processing device disables the read page cache mode. In some embodiments, this can include setting a read page cache mode flag (e.g., setting a read page cache mode flag to the logical value of "0"). At operation 708, the processing device sets a sequential read count to zero (or otherwise resets the sequential read count). The sequential read count indicates the number of sequentially read pages and setting the sequential read count to zero indicates that the next processed memory command 202 will not be a sequential read memory command 202. At operation 710, the processing device invalidates/clears cache information (e.g., an indication of a previously read page in the same memory block).

Returning to operation 604 of the method 600, in response to determining that the host read only mode is activated, which indicates that the received memory command 202 is a high priority memory command 202 (e.g., a host read memory command 202), the method 600 moves to operation 608. At operation 608, the processing device determines if the block referenced by the read memory command 202 is a closed TLC block. In particular, the read page cache mode may only be supported for closed TLC blocks and not for open TLC blocks. In other examples, the read page cache mode can be supported in open TLC block mode as well. However, the techniques described here are not limited to closed TLC blocks and the page cache mode can be used for other types of memory blocks in a potentially open state. In response to determining that the block referenced by the read memory command 202 is not a closed TLC block, the method 600 moves to operation 606. Conversely, in response to determining that the block referenced by the read memory command 202 is a closed TLC block, the method 600 moves to operation 610.

At operation 610, the processing device determines whether an initial NAND command or command sequence corresponding to the received read memory command from operation 602 is a single plane snap read command or a multiplane read command. In particular, the processing device can determine an initial NAND command/command sequence to satisfy the received read memory command 202 and determine whether that initial NAND command is a single plane snap read command. For example, when the size of the read memory command 202 is 4 KB, the processing device determines that the initial NAND command for the read memory command 202 is a single plane snap read. When the size of the read memory command 202 is 64 KB, the processing device determines that the initial NAND command for the read memory command 202 is a multiplane read command. This initial NAND command is an initial determination/guess made by the processing device and the processing device can revise this determination before sending/issuing a NAND command to the NAND array. The final command issued to the NAND depends on the state of the die/LUN and other context (e.g., previous NAND read commands, etc.). In response to determining that the initial NAND command is a single plane snap read command or a multiplane read command, the method 600 moves to operation 606. Conversely, in response to determining that the initial NAND command is not a single plane snap read command or a multiplane read command, the method 600 moves to operation 612.

At operation 612, the processing device determines if the read page cache mode is active in the addressed die/LUN. For example, the processing device can determine if a read page cache mode flag is set (e.g., set to the logical value of "1") to indicate that the read page cache mode is active/enabled. In response to determining that the read page cache mode is active, the method 600 moves to operation 614 (via off page connector A).

At operation 614, the processing device determines if the pending read memory command 202 hits a data cache register (e.g., a secondary data cache register) of the current plane (i.e., the data cache register stores data to satisfy the pending read memory command 202). In particular, the processing device can compare a current read flag, which indicates a page of data for the read memory command 202, with a previous read flag, which indicates a page of data in a data cache register corresponding to a previous read memory command 202, to determine if the pending read memory command 202 hits a data cache register of the of the current plane. In response to the processing device determining that the pending read memory command 202 hits a data cache register of the of the current plane, the method 600 moves to operation 616.

At operation 616, the processing device sets the NAND command sequence for the received/pending read memory command 202 to an LBA read no page read command sequence (a NAND_CMD_LBA_READ_NO_PAGE_READ command sequence), which returns the status of the addressed die, confirms whether the die is busy or ready for processing commands, and transfers data from data cache registers of a NAND array. Following operation 616, the method 600 moves to operation 618 to issue the NAND command sequence.

Returning to operation 614, in response to the processing device determining that the pending/current read memory command 202 does not hit a data cache register of the of the current plane, the method 600 moves to operation 620. At operation 620, the processing device determines if the pending read memory command 202 hits a data cache register (e.g., a secondary data cache register of the plane) of the next page in the same block. In particular, the processing device can compare a current read flag, which indicates a page of data for the read memory command 202, with a previous read flag that is incremented by one, which indicates a next page of data that is represented in a data cache register of the plane corresponding to a previous read memory command 202, to determine if the pending read memory command 202 hits a data cache register of the of the next page in the same block. In response to the processing device determining that the pending read memory command hits a data cache register of the of the next page of the same block, the method 600 moves to operation 622.

At operation 622, the processing device saves cache hit information, corresponding to the determined hit in the data cache register. In particular, the processing device saves/caches the previous read flag for future use. As noted above, the read flag indicates the current page being accessed and can be used to determine when sequential pages are being read.

At operation 624, the processing device sets the NAND command sequence for the received/pending read memory command 204 to an LBA read page cache sequential sequence (a NAND_CMD_LBA_READ_PAGE_CACHE_SEQ command sequence), which reads the next sequential page into a cache data register while the previous page is output from the cache data registers. Following operation 624, the method 600 moves to operation 618 to issue the NAND command sequence.

Returning to operation 620, in response to the processing device determining that the pending read memory command 202 does not hit a data cache register of the of the next page of the same block, the method 600 moves to operation 626.

At operation 626, the processing device determines if a read page cache mode is active in the addressed die/LUN and if the read page cache mode is active in the die, the processing device deactivates the read page cache mode and waits to handle the current non-high priority memory command 202 once corresponding cached information has been flushed. In some embodiments, operation 626 is similar or identical to operation 606. For example, operation 626 can be performed according to the operations of FIG. 7.

At operation 628, the processing device saves cache hit information. In some embodiments, operation 628 is similar or identical to operation 622. For example, the cache hit information can include a read flag that indicates the current page being accessed and can be used to determine when sequential pages are being read in subsequent reads.

At operation 630, the processing device sets the NAND command sequence for the received/pending read memory command 202 to a multi-plane LBA read command sequence (a NAND_CMD_MULTI_PLANE_LBA_READ command sequence), which queues a plane to transfer data from the NAND flash array to data cache registers. Following operation 630, the method 600 moves to operation 618 to issue the NAND command sequence.

Returning to operation 612, in response to the processing device determining that the read page cache mode is not activated/enabled, the method 600 moves to operation 632 (via off page connector B). At operation 632, the processing device determines if the pending read memory command 202 hits a data cache register (e.g., a secondary data cache register) of the of the current plane. In some embodiments, operation 632 is similar or identical to operation 614. In response to the processing device determining that the pending read memory command 202 hits a data cache register of the of the current plane, the method 600 moves to operation 634.

At operation 634, the processing device sets the NAND command sequence for the received/pending read memory command 202 to an LBA read no page read command sequence (a NAND_CMD_LBA_READ_NO_PAGE_READ command sequence), which returns the status of the addressed die, confirms whether the die is busy or ready for processing commands Following operation 634, the method 600 moves to operation 618 (via off page connector C) to issue the NAND command sequence.

Returning to operation 632, in response to the processing device determining that the pending read memory command 202 does not hit a data cache register of the of the current plane, the method 600 moves to operation 636. At operation 636, the processing device determines if the pending read memory command 202 hits a data cache register (e.g., a secondary data cache register) of the of the next page in the same block. In some embodiments, operation 636 is similar or identical to operation 620. In response to the processing device determining that the pending read memory command hits a data cache register of the of the next page of the same block, the method 600 moves to operation 638.

At operation 638, the processing device determines if a sequential read count meets a read page cache threshold. In particular, the sequential read count indicates the number of sequentially read pages without interruption. If the sequential read count meets the read page cache threshold (e.g., the sequential read count is greater than or equal to the read page cache threshold), the method 600 moves to operation 640.

At operation 640, the processing device enables the read page cache mode. In particular, the processing device sets a read page cache mode flag (e.g., setting a read page cache mode flag to the logical value of "1") to enable/activate the read page cache mode.

At operation 642, the processing device saves cache hit information, corresponding to the determined hit in the data cache register. In particular, the processing device saves/caches the previous read flag for future user.

At operation 644, the processing device sets the NAND command sequence for the received/pending read memory command 202 to a multi-plane LBA read page cache sequence (a NAND_CMD_MULTI_PLANE_LBA_READ_PAGE_CACHE_SEQ command sequence), which queues a plane to transfer data from the NAND flash array to data cache registers. Following operation 644, the method 600 moves to operation 618 (via off page connector C) to issue the NAND command sequence.

Returning to operation 638, if the sequential read count does not meet the read page cache threshold (e.g., the sequential read count is less than the read page cache threshold), the method 600 moves to operation 646. At operation 646, the processing device increments the sequential read count by one, to indicate another sequentially read page.

At operation 648, the processing device saves cache hit information, corresponding to the determined hit in the data cache register. In particular, the processing device saves/caches the previous read flag for future user.

At operation 650, the processing device sets the NAND command sequence for the received/pending read memory command 202 to a multi-plane LBA read command sequence (a NAND_CMD_MULTI_PLANE_LBA_READ command sequence), which queues a plane to transfer data from the NAND flash array to data cache registers. Following operation 650, the method 600 moves to operation 618 (via off page connector C) to issue the NAND command sequence.

Returning to operation 636, in response to the processing device determining that the pending read memory command does not hit a data cache register of the of the next page of the same block, the method 600 moves to operation 652. At operation 652, the processing device sets the sequential read count to one, to indicate a single sequential read. Following operation 652, the method 600 moves to operation 648.

Figure 8:
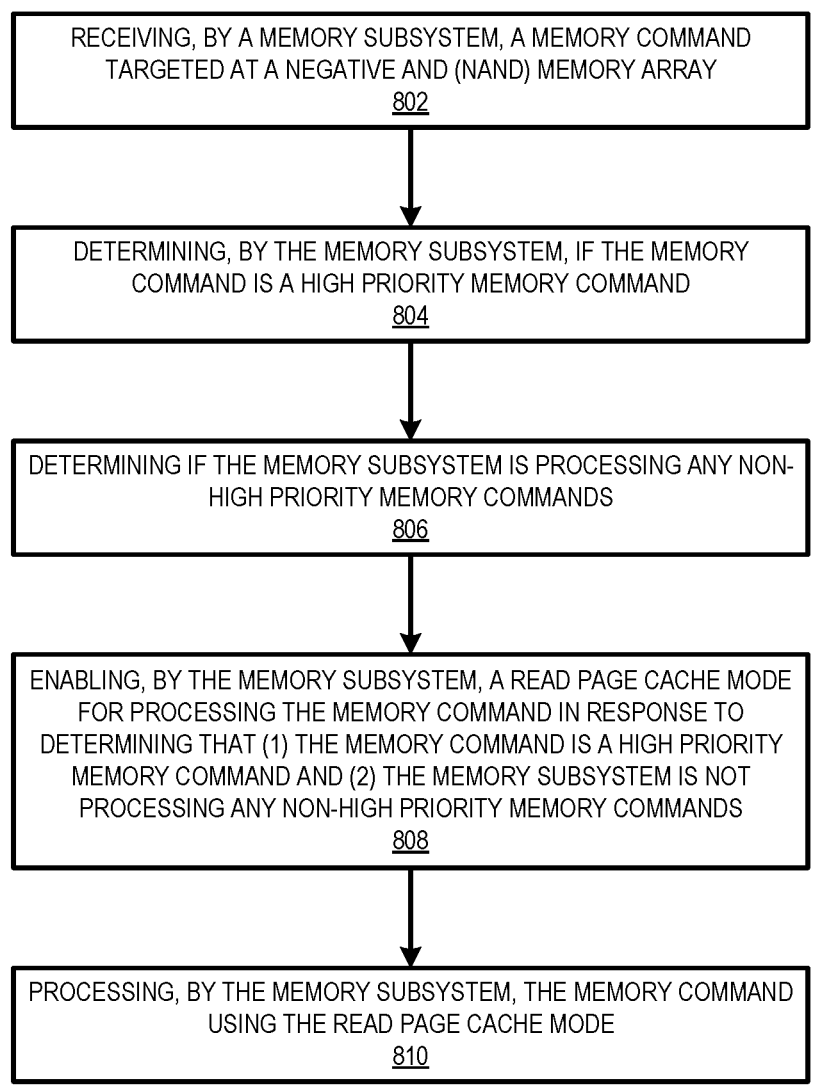
FIG. 8 is a flow diagram of another example method to process memory commands in the memory subsystem selectively using a read page cache mode, in accordance with some embodiments of the present disclosure.

Turning now to FIG. 8, a flow diagram will be described of another example method 800 to process memory commands 202 in the memory subsystem 110 selectively using a read page cache mode, in accordance with some embodiment of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the read page component 113 of FIG. 1. Although shown in a particular sequence or order, unless otherwise specified, the order of the operations can be modified. Thus, the illustrated embodiments should be understood only as examples, and the illustrated processes can be performed in a different order, and some processes can be performed in parallel. Additionally, one or more operations can be omitted in various embodiments. Thus, not all operations are required in every embodiment. Other process flows are possible.

As shown in FIG. 8, the method 800 commences at operation 802 with the processing device (e.g., the memory subsystem 110) receiving a memory command. In particular, the memory subsystem 110 can receive a memory command from the host system 120 (e.g., a write command) or the memory command can be generated by the memory subsystem 110 (e.g., a read, program, or erase memory command as part of a garbage collection routine). In some embodiments, the memory command can be one of the memory commands 202 shown in FIG. 2.

At operation 804, the processing device determines if the receive memory command is a high-priority memory command. In particular, the processing device can compare the received memory command to the memory commands 202 in the table 200 to determine a priority level 204 associated with the received memory command. In some embodiments, the received memory command is a high priority memory command when the received memory command is a host read memory command, which originates from the host system 120 and seeks to read data from a NAND array of the memory subsystem 110 (e.g., the memory device 130/140).

At operation 806, the processing device determines if the memory subsystem 110 is processing any non-high priority memory commands. As noted above, the table 200 of FIG. 2 can indicate what memory commands 202 are high priority (e.g., HIGH (2)) or non-high priority (e.g., MEDIUM (1) or LOW (0) priority). In some embodiments, the processing device can use the method 400 of FIG. 4 and the method 500 of FIG. 5 to determine if the memory subsystem 110 is processing any non-high priority memory commands.

At operation 808, the processing device enables a read page cache mode for processing the received memory command in response to determining that (1) the received memory command is a high priority memory command and (2) the memory subsystem 110 is not processing any non-high priority memory commands. The read page cache mode includes transferring data from a memory device 130/140 (e.g., a NAND memory array) to a set of data cache registers prior to transferring to the host system 120.

At operation 810, the processing device processes the memory command using the read page cache mode. In particular, the processing device utilizes the data cache registers of the memory device 130/140 to read data from the memory device 130/140 and thereafter transfer the cached data to the host system 120.

Figure 9:
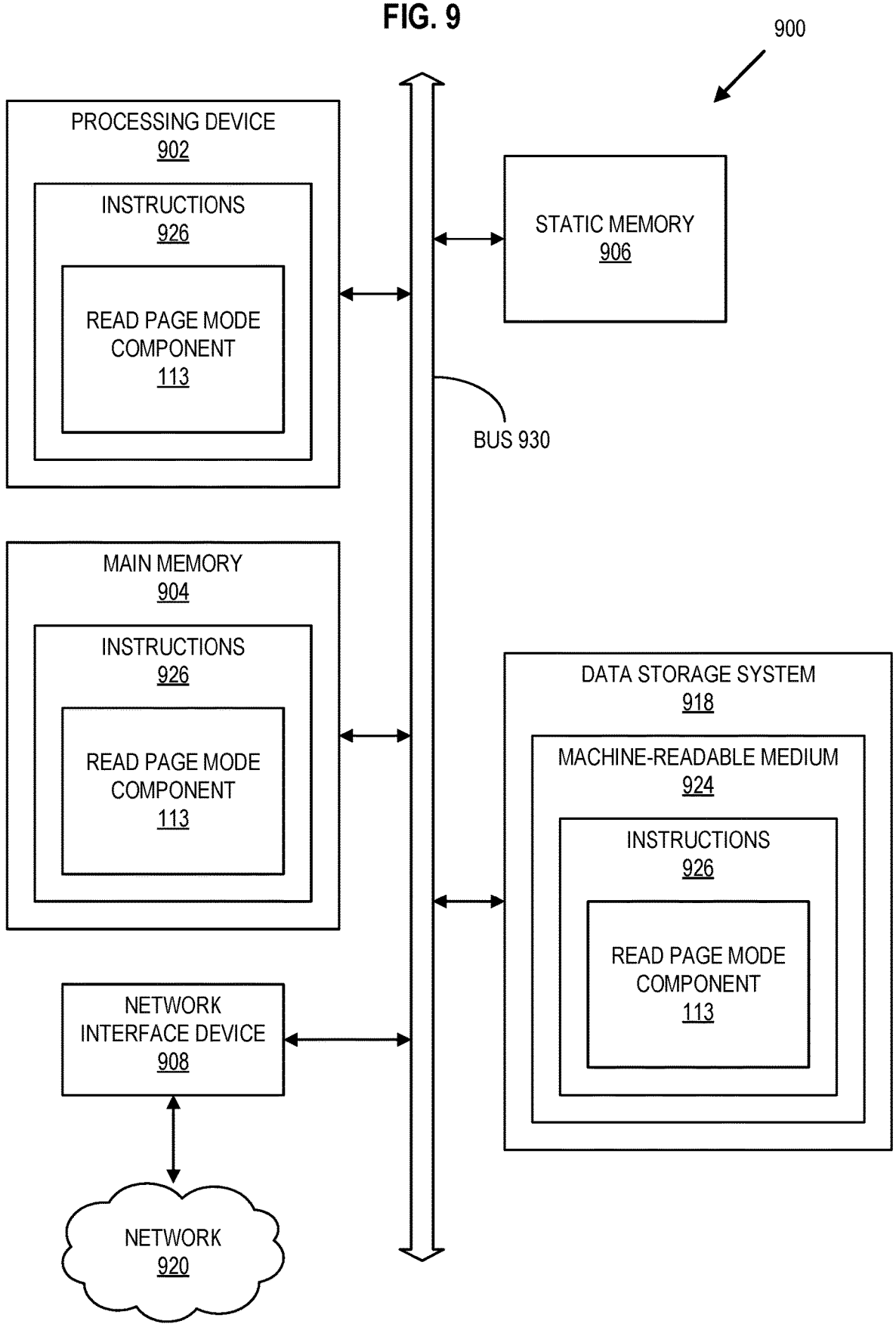
FIG. 9 is a block diagram of an example computer system in which embodiments of the present disclosure may operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the read page mode component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory subsystem 110 of FIG. 1.

In one embodiment, the instructions 926 include instructions to implement functionality corresponding to a read page mode component (e.g., the read page mode component 113 of FIG. 1). While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented method 400, 500, 600, and 800 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving, by a memory subsystem, a memory command targeted at a memory array;
   determining, by the memory subsystem, if the memory command is a multi-plane memory command having a first priority;
   determining if the memory subsystem is processing any memory commands having a second priority that is less than the first priority;
   enabling, by the memory subsystem, a read page cache mode for processing the memory command in response to determining that (1) the memory command has the first-priority and (2) the memory subsystem is not processing any memory commands having the second priority, wherein the read page cache mode allows multiple reads to be performed in parallel by using a primary data cache register and a secondary data cache register; and
   processing, by the memory subsystem, the memory command using the read page cache mode.

2. The method of claim 1, wherein the read page cache mode utilizes a set of data cache registers for each plane of the memory array, including the primary data cache register and the secondary data cache register, and
   wherein processing the memory command using the read page cache mode includes transferring data from the memory array to the set of data cache registers prior to transferring the data to a host system.

3. The method of claim 2, wherein a high priority memory command is a read memory command that originated from the host system.

4. The method of claim 1, further comprising:
   determining, by the memory subsystem, whether the memory command hits a next sequential page in a same block as a previous memory command; and
   wherein enabling the read page cache mode is further in response to determining that the memory command hits the next sequential page in the same block as the previous memory command.

5. The method of claim 4, further comprising:
   incrementing, in response to determining that the memory command hits the next sequential page in the same block as the previous memory command, a sequential read count, which indicates a number of consecutively sequential page reads to the same block.

6. The method of claim 5, wherein the enabling the read page cache mode is further in response to determining that the sequential read count does not meet a read page cache threshold.

7. The method of claim 1, wherein determining if the memory subsystem is processing any memory commands having the second priority includes:
   maintaining a first count of memory commands having the second priority issued in the memory subsystem;
   maintaining a second count of memory commands having the second priority completed in the memory subsystem; and
   comparing the first count to the second count to determine if the memory subsystem is processing any memory commands having the second priority.

8. A non-transitory computer-readable storage medium comprising instructions that, when executed by a processing device, cause the processing device to:

receive a memory command targeted at a memory array of a memory subsystem;
determine if the memory command is a milt-plane memory command having a first priority;
determine if the memory subsystem is processing memory commands having a second priority that is less than the first priority;
enable a read page cache mode for processing the memory command in response to determining that (1) the memory command has the first priority and (2) the memory subsystem is not processing any memory commands having the second priority, wherein the read page cache mode allows multiple reads to be performed in parallel by using a primary data cache register and a secondary data cache register; and
process the memory command using the read page cache mode.

9. The non-transitory computer-readable storage medium of claim 8, wherein the read page cache mode utilizes a set of data cache registers for each plane of the memory array, including the primary data cache register and the secondary data cache register, and
wherein processing the memory command using the read page cache mode includes transferring data from the memory array to the set of data cache registers prior to transferring the data to a host system.

10. The non-transitory computer-readable storage medium of claim 9, wherein a high priority memory command is a read memory command that originated from the host system.

11. The non-transitory computer-readable storage medium of claim 8, wherein the processing device is further to:
determine whether the memory command hits a next sequential page in a same block as a previous memory command; and
wherein enabling the read page cache mode is further in response to determining that the memory command hits the next sequential page in the same block as the previous memory command.

12. The non-transitory computer-readable storage medium of claim 11, wherein the processing device is further to:
increment, in response to determining that the memory command hits the next sequential page in the same block as the previous memory command, a sequential read count, which indicates a number of consecutively sequential page reads to the same block.

13. The non-transitory computer-readable storage medium of claim 12, wherein the enabling the read page cache mode is further in response to determining that the sequential read count does not meet a read page cache threshold.

14. The non-transitory computer-readable storage medium of claim 8, wherein determining if the memory subsystem is processing any memory commands having the second priority includes:
maintaining a first count of memory commands having the second priority issued in the memory subsystem;
maintaining a second count of memory commands having the second priority completed in the memory subsystem; and
comparing the first count to the second count to determine if the memory subsystem is processing any memory commands having the second priority.

15. A system comprising:
a memory device; and
a processing device, operatively coupled with the memory device, to:
determine if a memory command, to be processed in relation to the memory device, is a multi-plane memory command having a first priority;
determine if the system is processing any multi-plane memory commands having a second priority that is less than the first priority;
enable a read page cache mode for processing the memory command in response to determining that (1) the memory command has the first priority and (2) the memory device is not processing any memory commands having the second priority, wherein the read page cache mode allows multiple reads to be performed in parallel by using a primary data cache register and a secondary data cache register; and
process the memory command using the read page cache mode.

16. The system of claim 15, wherein the read page cache mode utilizes a set of data cache registers for each plane of the memory device, including the primary data cache register and the secondary data cache register, and
wherein processing the memory command using the read page cache mode includes transferring data from the memory device to the set of data cache registers prior to transferring the data to a host system.

17. The system of claim 16, wherein a high priority memory command is a read memory command that originated from the host system.

18. The system of claim 15, wherein the processing device is further to:
determine whether the memory command hits a next sequential page in a same block as a previous memory command; and
wherein enabling the read page cache mode is further in response to determining that the memory command hits the next sequential page in the same block as the previous memory command.

19. The system of claim 18, wherein the processing device is further to:
increment, in response to determining that the memory command hits the next sequential page in the same block as the previous memory command, a sequential read count, which indicates a number of consecutively sequential page reads to the same block; and
wherein the enabling the read page cache mode is further in response to determining that the sequential read count does not meet a read page cache threshold.

20. The system of claim 15, wherein determining if the system is processing any memory commands having the second priority includes:
maintaining a first count of memory commands having the second priority issued in the system;
maintaining a second count of memory commands having the second priority completed in the system; and
comparing the first count to the second count to determine if the system is processing any memory commands having the second priority.

* * * * *